April 8, 1924.
L. T. MURRAH
AUTOMOBILE TIRE LOCK
Filed May 31, 1922
1,489,272
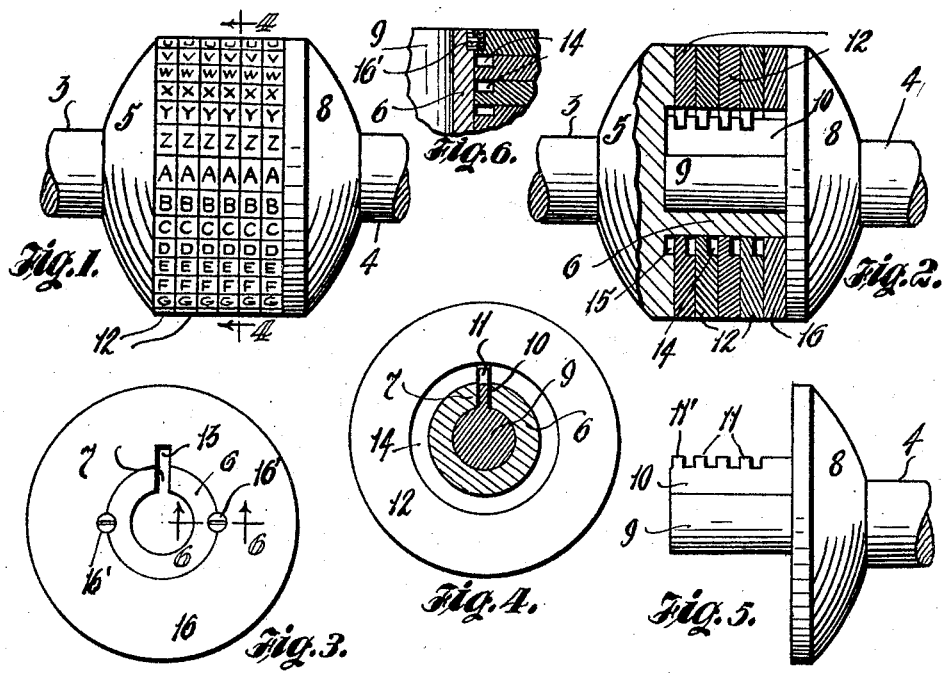
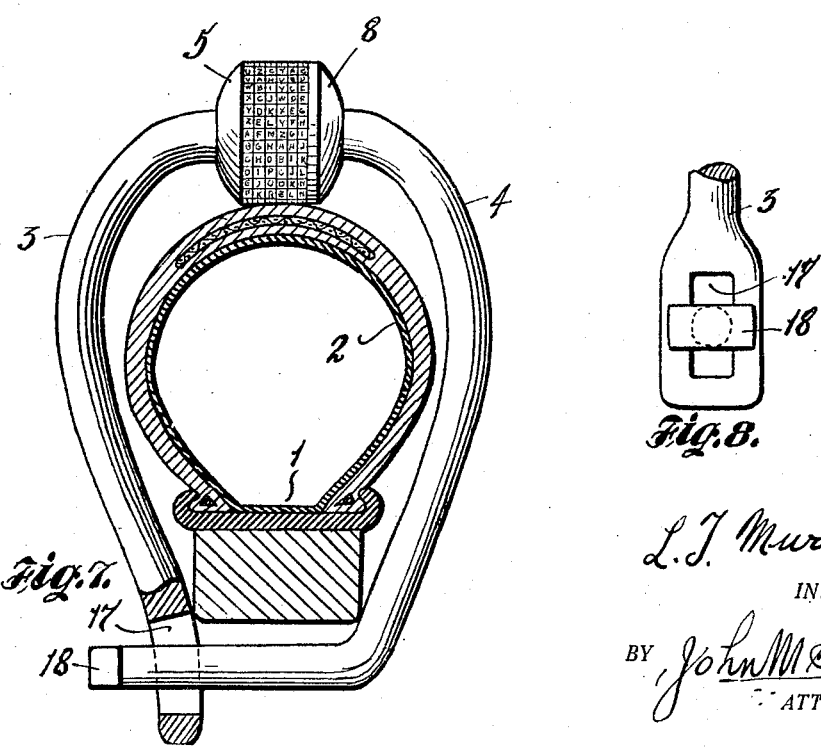
L. T. Murrah
INVENTOR.
BY John M. Spellman
ATTORNEYS.

Patented Apr. 8, 1924.

1,489,272

UNITED STATES PATENT OFFICE.

LOUIE T. MURRAH, OF DALLAS, TEXAS.

AUTOMOBILE TIRE LOCK.

Application filed May 31, 1922. Serial No. 564,858.

*To all whom it may concern:*

Be it known that I, LOUIE T. MURRAH, a citizen of the United States, residing at Dallas, in the county of Dallas and State of Texas, have invented certain new and useful Improvements in Automobile Tire Locks, of which the following is a specification.

This invention relates to locks and more particularly to automobile tire locks or may be utilized as a cycle lock or for other locking purposes.

The primary object of the invention is to provide a lock for securing the extra or emergency tires, usually carried on automobiles, against theft, and to lock such tire or tires to the tire supporting rim, frame or other support of the vehicle.

Another object of the invention is to provide a lock of this nature having a plurality of letter or numbered disks to provide a combination obtained by rotation of the disks to lock and unlock the device.

Other minor objects will become apparent by reference to the following description, taken in connection with the accompanying drawings, forming part hereof in which—

Figure 1 is a sectional view of the main part of the lock representing the disks and adjacent parts comprising the locking combination.

Figure 2 is a view similar to Figure 1, but in vertical section.

Figure 3 is a side elevational view of one of the disks of the mechanism.

Figure 4 is a cross-sectional view, taken on line 4—4 of Figure 1.

Figure 5 is a detail view of the removable end of the lock separated from the disks.

Figure 6 is a detail sectional view taken on line 6—6 of Figure 3.

Figure 7 is a view of the assembled lock illustrated in position on a supporting rim and encircling a tire; and Figure 8 is a detail view of the exterior ends of the locking arms.

In the drawings in Figure 7 the lock is shown assembled and in position on a rim 1 usually secured to the rear of the vehicle and supporting a tire 2. The lock comprises two arms 3 and 4, the arm 3 having on its inner end an integrally formed knob 5 with a tubular extension 6 and provided with a longitudinal slot 7. The arm 4 has a knob 8 with a cylindrical projection 9 formed with a vertical flange 10 with teeth 11—11. The projection 9 is thus adapted to be passed into the tubular portion 6, the flange 10 being received in the slot 7 when locking and unlocking the device.

The lock has a number of disks 12—12 which are notched at 13 to permit the flange and teeth 10 and 11 to be passed therethrough. Each disk 12 has also an annular shoulder 14 to permit the disks when rotated to bear against but allow them to pass the teeth 11 as the disks are rotated according to a predetermined combination of the letters on the peripheries of the disks. When the disks 12—12 are rotated to the desired combination the notches 13 on the disks will be in line and register with the flange and teeth 10 and 11 and the two arms 3 and 4 may then be disengaged. The disks 12—12 are held in position against dislodgment by a washer 16 similar to the disks, except that it has no shoulder 14. Screws 16' hold the washer in position. The knob 5 has an annular recess 15 to permit the tooth 11' to rotate. The outer end of arm 3 is slotted at 17 to receive the T-shaped outer end 18 of arm 4. Thus when the two inner ends of the arms are disengaged, arm 4 is turned to permit the T-shaped end to pass through the slot 17, illustrated in Figure 8.

It should be understood that minor changes, such as increasing the number of disks, using figures or other symbols instead of letters, and the like, may be made in the structure comprising the invention, without departing from the meaning and to come within the scope of the following claim.

I claim—

An automobile tire lock including a pair of curved arms formed to engage over the opposite sides of the tire and wheel felloe, the inner end of one arm being formed to extend transversely across the inner circumference of the wheel felloe and beyond the opposite side thereof and being formed with a T-shaped head, the inner end of the other arm extending beyond the inner circumference of the wheel felloe and being formed with an elongated slot to receive the T-shaped head in one position of the latter, and combination controlled means carried by the opposite ends of the arms to lock the latter together and formed to engage the tire tread.

In testimony whereof I have signed my name to this specification.

LOUIE T. MURRAH.